United States Patent
Han et al.

(10) Patent No.: US 11,210,024 B2
(45) Date of Patent: Dec. 28, 2021

(54) OPTIMIZING READ-MODIFY-WRITE OPERATIONS TO A STORAGE DEVICE BY WRITING A COPY OF THE WRITE DATA TO A SHADOW BLOCK

(71) Applicant: International Business Machines Corporation, Armonk, NY (US)

(72) Inventors: Zhenxing Han, San Jose, CA (US); Robert Michael Rees, Los Gatos, CA (US); Steven Robert Hetzler, Los Altos, CA (US); Veera W. Deenadhayalan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 16/716,301

(22) Filed: Dec. 16, 2019

(65) Prior Publication Data

US 2021/0181977 A1    Jun. 17, 2021

(51) Int. Cl.
*G06F 3/06* (2006.01)
*G06F 9/4401* (2018.01)

(52) U.S. Cl.
CPC .......... *G06F 3/0659* (2013.01); *G06F 3/0604* (2013.01); *G06F 3/064* (2013.01); *G06F 3/065* (2013.01); *G06F 3/067* (2013.01); *G06F 9/4401* (2013.01)

(58) Field of Classification Search
CPC .... G06F 3/0659; G06F 3/0604; G06F 9/4401; G06F 3/067; G06F 3/064; G06F 3/065
See application file for complete search history.

(56) References Cited

U.S. PATENT DOCUMENTS

| | | |
|---|---|---|
| 7,953,946 | 5/2011 | Anand et al. |
| 8,533,440 | 9/2013 | Levanoni et al. |
| 8,782,389 | 7/2014 | Dolgunov et al. |
| 9,389,805 | 7/2016 | Cohen et al. |
| 2006/0036817 * | 2/2006 | Oza .............. G06F 9/3834 711/155 |
| 2014/0164828 * | 6/2014 | Banikazemi ...... G06F 11/1004 714/15 |
| 2018/0039547 | 2/2018 | Madiraju Varadaraju et al. |
| 2018/0046548 | 2/2018 | Goikhman et al. |

FOREIGN PATENT DOCUMENTS

EP    460934 A2    12/1991

OTHER PUBLICATIONS

Harris et al., "Transactional Memory: An Overview," IEEE Micro, IEEE Computer Society, May-Jun. 2007, pp. 8-29.

* cited by examiner

*Primary Examiner* — Michelle T Bechtold
(74) *Attorney, Agent, or Firm* — Zilka-Kotab, P.C.

(57) ABSTRACT

A computer-implemented method according to one embodiment includes initiating a read-modify-write (RMW) operation; assigning the RMW operation to a thread; identifying a storage device associated with the RMW operation; assign a log block within the storage device to the thread; determining a free shadow block location within the storage device; creating a copy of data to be written to the storage device during the RMW operation; writing the copy of the data to the free shadow block location within the storage device; updating the log block within the storage device to point to the free shadow block location to which the copy of the data is written; and writing the data to one or more blocks of a home area of the storage device.

20 Claims, 11 Drawing Sheets

| Storage Device # | Log Block and Shadow Block 1 of Thread N | Log Block and Shadow Block 2 of Thread N |
|---|---|---|
| 0 | | |
| 1 | | |
| 2 | | |

| Log Block and Shadow Block of Thread N | Storage Device # |
|---|---|
| | 0 |
| | 1 |
| | 2 |

FIG. 9

OPTIMIZING READ-MODIFY-WRITE OPERATIONS TO A STORAGE DEVICE BY WRITING A COPY OF THE WRITE DATA TO A SHADOW BLOCK

BACKGROUND

The present invention relates to data protection, and more specifically, this invention relates to ensuring data consistency via write operation atomicity.

Many storage devices (e.g., non-volatile, block-addressable storage, etc.) implement erasure code-protected data storage. Erasure codes may store both data as well as some form of parity computed from the data. In order to implement erasure code-protected data storage, both the data and the parity information need to be updated in the same atomic transaction (e.g., to prevent data corruption). However, current methods for implementing such erasure code protection are expensive, and complex.

SUMMARY

A computer-implemented method according to one embodiment includes initiating a read-modify-write (RMW) operation; assigning the RMW operation to a thread; identifying a storage device associated with the RMW operation; assigning a log block within the storage device to the thread; determining a free shadow block location within the storage device; creating a copy of data to be written to the storage device during the RMW operation; writing the copy of the data to the free shadow block location within the storage device; updating the log block within the storage device to point to the free shadow block location to which the copy of the data is written; and writing the data to one or more blocks of a home area of the storage device.

According to another embodiment, a computer program product for optimizing atomic writes to a storage device includes a computer readable storage medium having program instructions embodied therewith, where the computer readable storage medium is not a transitory signal per se, and where the program instructions are executable by a processor to cause the processor to perform a method including initiating, by the processor, a read-modify-write (RMW) operation; assigning, by the processor, the RMW operation to a thread; identifying, by the processor, the storage device associated with the RMW operation; assigning, by the processor, a log block within the storage device to the thread; determining, by the processor, a free shadow block location within the storage device; creating, by the processor, a copy of data to be written to the storage device during the RMW operation; writing, by the processor, the copy of the data to the free shadow block location within the storage device; updating, by the processor, the log block within the storage device to point to the free shadow block location to which the copy of the data is written; and writing, by the processor, the data to one or more blocks of a home area of the storage device.

According to another embodiment, a system includes a processor; and logic integrated with the processor, executable by the processor, or integrated with and executable by the processor, where the logic is configured to initiate a read-modify-write (RMW) operation; assign the RMW operation to a thread; assign a log block within the storage device to the thread; identify a storage device associated with the RMW operation; determine a free shadow block location within the storage device; create a copy of data to be written to the storage device during the RMW operation; write the copy of the data to the free shadow block location within the storage device; update the log block within the storage device to point to the free shadow block location to which the copy of the data is written; and write the data to one or more blocks of a home area of the storage device.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 7 illustrates an exemplary representation of combined log and shadow blocks within a plurality of storage devices, in accordance with one embodiment of the present invention.

FIG. 9 illustrates an exemplary representation of a single combined log and shadow block within a plurality of storage devices, in accordance with one embodiment of the present invention.

DETAILED DESCRIPTION

Figure 1:
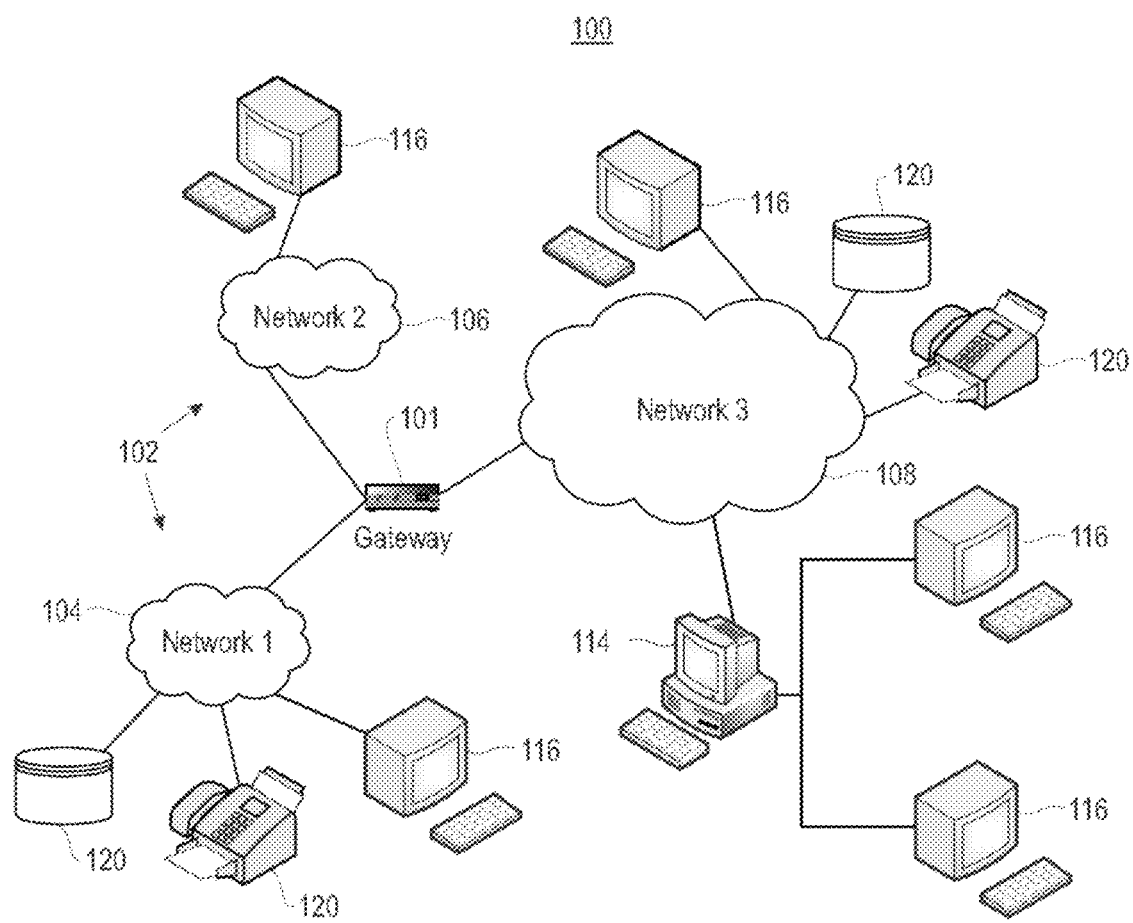
FIG. 1 illustrates a network architecture, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for optimizing atomic writes to a storage device.

In one general embodiment, a computer-implemented method includes initiating a read-modify-write (RMW) operation; assigning the RMW operation to a thread; identifying a storage device associated with the RMW operation; assigning a log block within the storage device to the thread; determining a free shadow block location within the storage device; creating a copy of data to be written to the storage device during the RMW operation; writing the copy of the data to the free shadow block location within the storage device; updating the log block within the storage device to point to the free shadow block location to which the copy of the data is written; and writing the data to one or more blocks of a home area of the storage device.

In another general embodiment, a computer program product for optimizing atomic writes to a storage device includes a computer readable storage medium having program instructions embodied therewith, where the computer readable storage medium is not a transitory signal per se, and where the program instructions are executable by a processor to cause the processor to perform a method including initiating, by the processor, a read-modify-write (RMW) operation; assigning, by the processor, the RMW operation to a thread; identifying, by the processor, the storage device associated with the RMW operation; assigning, by the processor, a log block within the storage device to the thread; determining, by the processor, a free shadow block location within the storage device; creating, by the processor, a copy of data to be written to the storage device during the RMW operation; writing, by the processor, the copy of the data to the free shadow block location within the storage device; updating, by the processor, the log block within the storage device to point to the free shadow block location to which the copy of the data is written; and writing, by the processor, the data to one or more blocks of a home area of the storage device.

In another general embodiment, a system includes a processor; and logic integrated with the processor, executable by the processor, or integrated with and executable by the processor, where the logic is configured to initiate a read-modify-write (RMW) operation; assign the RMW operation to a thread; assign a log block within the storage device to the thread; identify a storage device associated with the RMW operation; determine a free shadow block location within the storage device; create a copy of data to be written to the storage device during the RMW operation; write the copy of the data to the free shadow block location within the storage device; update the log block within the storage device to point to the free shadow block location to which the copy of the data is written; and write the data to one or more blocks of a home area of the storage device.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 116 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
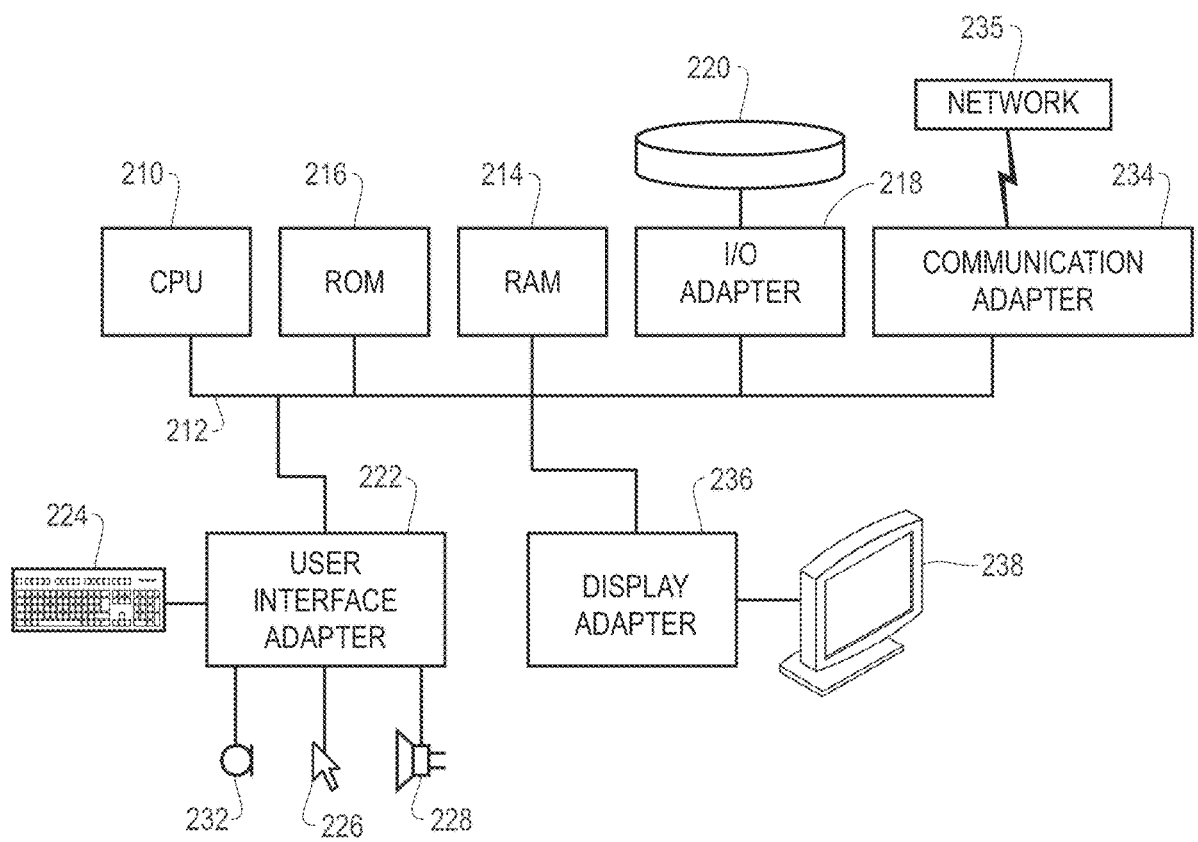
FIG. 2 shows a representative hardware environment that may be associated with the servers and/or clients of FIG. 1, in accordance with one embodiment of the present invention.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
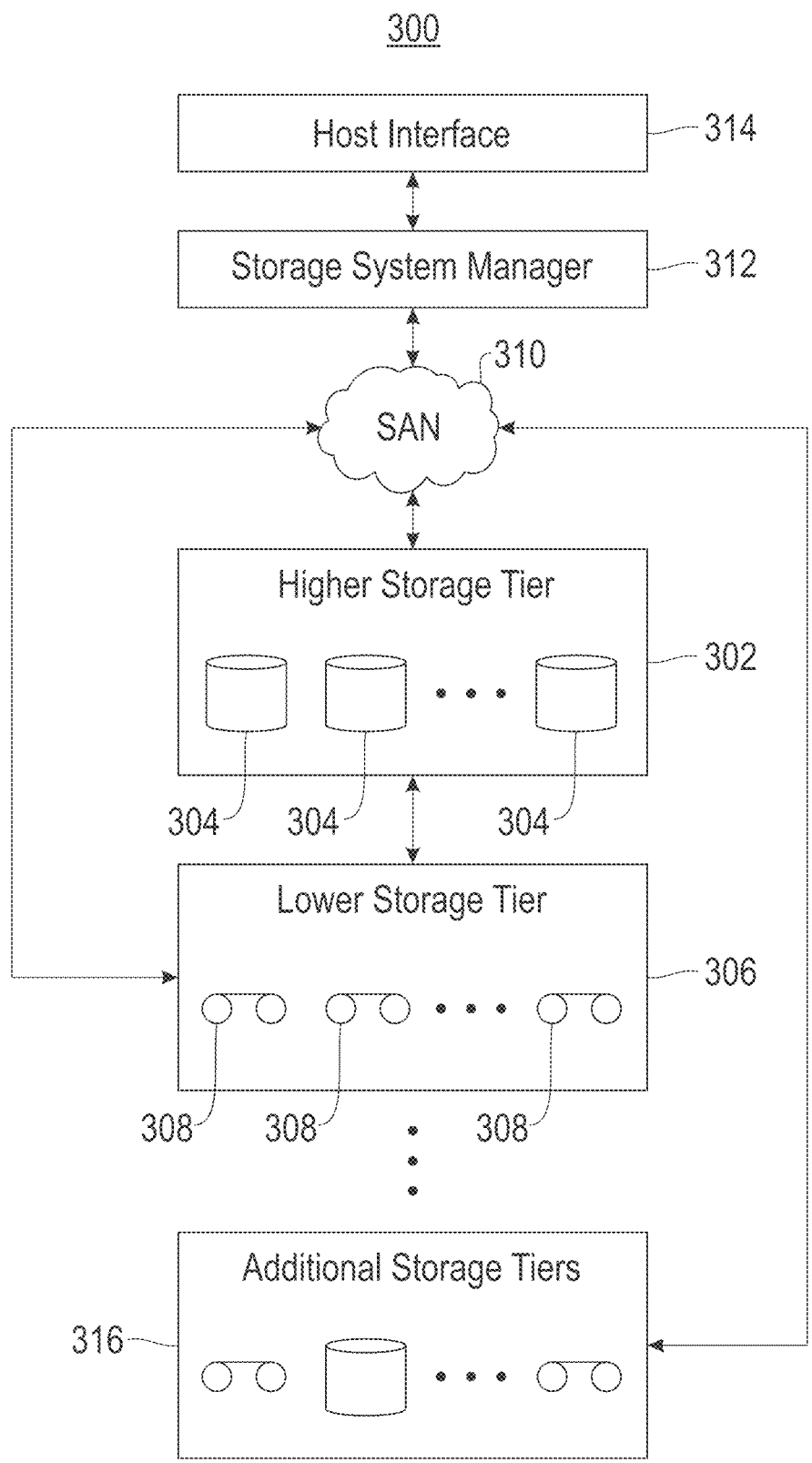
FIG. 3 illustrates a tiered data storage system in accordance with one embodiment of the present invention.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
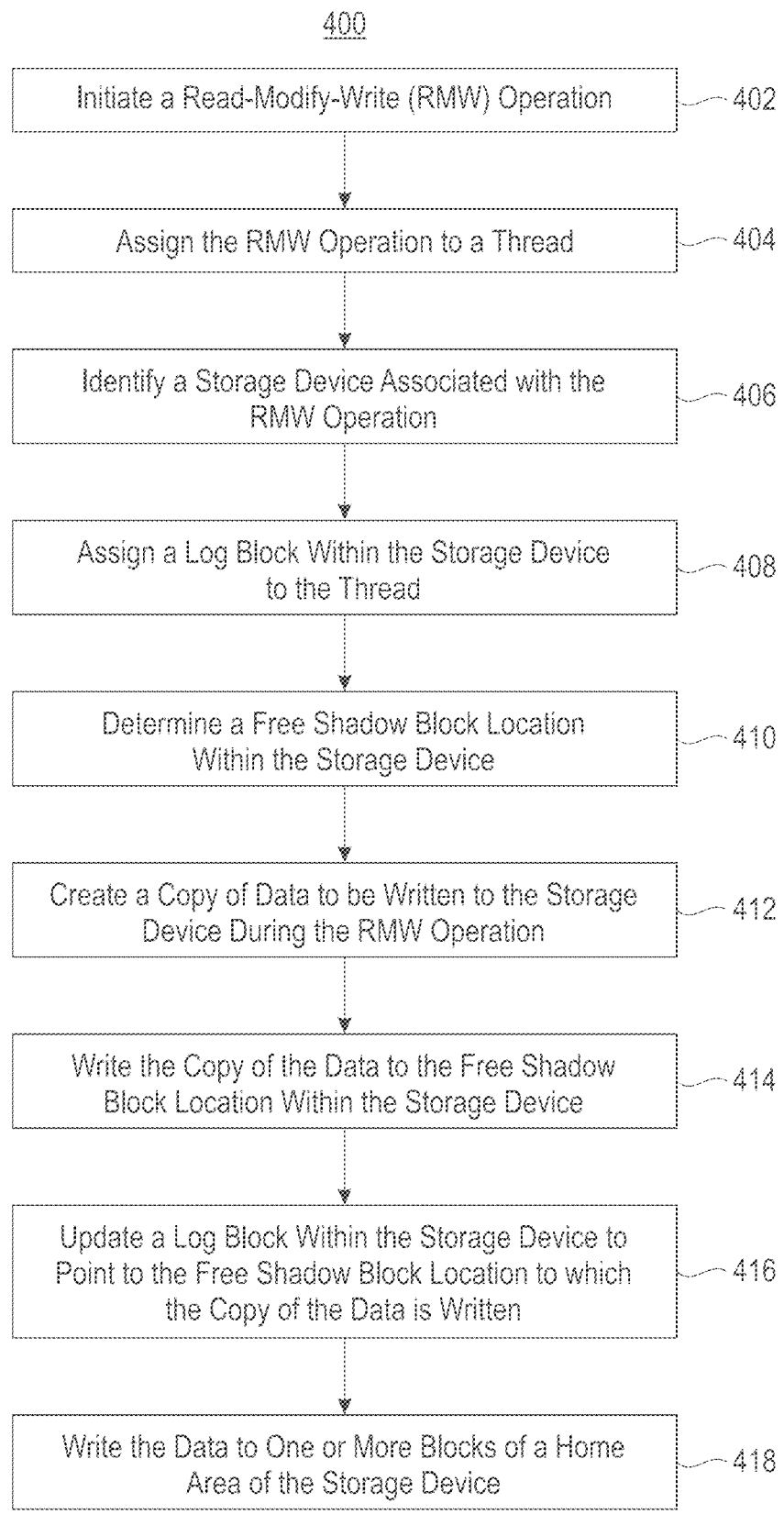
FIG. 4 illustrates a method for optimizing atomic writes to a storage device, in accordance with one embodiment of the present invention.

Now referring to FIG. 4, a flowchart of a method 400 is shown according to one embodiment. The method 400 may be performed in accordance with the present invention in any of the environments depicted in FIGS. 1-3, and 6-8, among others, in various embodiments. Of course, greater or fewer operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a read-modify-write (RMW) operation is initiated. In one embodiment, the RMW operation may include an operation that writes data to one or more storage devices. In another embodiment, the RMW operation may read old data and corresponding parity information from one or more predetermined locations within one or more storage devices.

Additionally, in one embodiment, the RMW operation may modify the read data, as well as the corresponding parity information. In another embodiment, the RMW operation may modify the read data, as well as the corresponding parity information.

Further, in one embodiment, the one or more storage devices may be included within a distributed storage environment. For example, the distributed storage environment may include a plurality of erasure code-protected storage devices (e.g., an erasure code array that includes an array of storage devices that implement an erasure code, etc.). In another example, the distributed storage environment may include a plurality of replication storage devices (e.g., a replication array that includes an array of storage devices that implement replication, etc.). In yet another example, the distributed storage environment may include data storage, cloud-based storage, local storage, etc. In yet another example, erasure code-protected storage may include a method of storing data that transforms data into a code word, where the data can be recovered using a subset of such code word.

Further still, in one embodiment, the RMW operation may be initiated within intermediary storage. For example, the intermediary storage may include one or more volatile data buffers at one or more host computers that are in communication with the one or more storage devices. In another example, the intermediary storage may include volatile memory such as dynamic random-access memory (DRAM), static random-access memory (SRAM), etc. In yet another example, the RMW operation may be buffered in the intermediary storage before writes are performed at the one or more storage devices.

Also, method 400 may proceed with operation 404, where the RMW operation is assigned to a thread. In one embodiment, the thread may include a predetermined sequence of programmed instructions. In another embodiment, the thread may be managed by a scheduler within an operating system (OS) of a system.

In addition, in one embodiment, the thread may be associated with predetermined home area blocks of each of a plurality of storage devices, as well as predetermined log blocks. For example, the home area blocks may include storage blocks within the storage devices that are reserved for storing data to be written. In another example, the predetermined home area blocks may be reserved for the thread within the system, within the one or more storage devices, etc.

Furthermore, in one embodiment, the thread may be associated with predetermined log shadow blocks of each of the plurality of storage devices. For example, the log shadow blocks may include shadow blocks within the storage devices that are reserved for storing temporary copies of the data written to the home area blocks, as well as for storing log blocks that point to active shadow blocks.

Further still, in one embodiment, the amount of home area blocks and log shadow blocks may be predetermined, may be based on historical or predicted input/output (I/O) workloads to the storage devices, etc. In another embodiment, the home area blocks and log shadow blocks may be divided using partitions, or may be intermixed using logical partitions without physical partitions. IN yet another embodiment, the RMW operation may be assigned a monotonically-increasing transaction sequence number associated with the RMW operation.

Also, method 400 may proceed with operation 406, where a storage device associated with the RMW operation is identified. In one embodiment, the RMW operation may instruct the writing of data to a specific plurality of storage devices within a distributed storage environment. In another embodiment, each of the specific plurality of storage devices may be identified, based on the RMW operation. In yet another embodiment, each of the specific plurality of storage devices may be identified based on a specific erasure code utilized within the distributed storage environment.

Further, method 400 may proceed with operation 408, where a log block within the storage device is assigned to the thread. In one embodiment, a log block within each storage device that is involved in the RMW transaction may be assigned to the thread.

Additionally, method 400 may proceed with operation 410, where a free shadow block location is determined within the storage device. In one embodiment, the storage device may include log shadow blocks reserved for the thread to which the RMW operation is assigned. In another embodiment, the reserved log shadow blocks may include an active shadow block and a free shadow block.

For example, the active shadow block may include the latest temporary copy of data that is written/to be written to home area blocks within the storage device. In another example, the free shadow block may include a temporary copy of other data that older than the data stored in the active shadow block.

Further, in one embodiment, the reserved log shadow blocks may also include a log block. For example, the log block may point to a location of the active shadow block within the storage device. In another embodiment, the free shadow block location may be determined utilizing the log block within the storage device.

For example, locations of a first shadow block and a second shadow block may be identified within the storage device. In another example, the log block may be referenced to identify whether the first or second shadow block is the active shadow block. In yet another example, the free shadow block location may include the shadow block that is not the identified active shadow block.

Further still, in one embodiment, the free shadow block location may be determined utilizing a location cache. For example, the locations of the free shadow block and the active shadow block may be stored in the location cache. In another example, the cache may be referenced to determine the location of the free shadow block.

Also, method 400 may proceed with operation 412, where a copy of data to be written to the storage device during the RMW operation is created. In one embodiment, the copy of the data may be created within the intermediary storage. In another embodiment, the copy of the data may be created by the thread to which the RMW operation is assigned.

In addition, method 400 may proceed with operation 414, where the copy of the data is written to the free shadow block location within the storage device. In one embodiment, the copy of the data may be written from the intermediary storage to the storage device. In another embodiment, the copy of the data may be written by the thread to which the RMW operation is assigned.

Furthermore, method 400 may proceed with operation 416, where the log block within the storage device is updated to point to the free shadow block location to which the copy of the data is written. In one embodiment, the log block may be included within the log shadow blocks that are reserved for the thread within the storage device. In another embodiment, the log block may initially point to the active shadow block.

Further still, in one embodiment, once the copy of the data has been written to the free shadow block, the free shadow block may be updated to become the updated active shadow block. Likewise, the active shadow block may be updated to become the updated free shadow block. As a result, the log block may be updated to point to the updated active shadow block.

Also, in one embodiment, the log block may be updated simultaneously with the writing of the copy of the data to the free shadow block location. This may reduce a number of I/O operations during the RMW operation. In another embodiment, the transaction sequence number associated with the RMW operation may also be stored within the log block.

Additionally, method 400 may proceed with operation 418, where the data is written to one or more blocks of a home area of the storage device. In one embodiment, the one or more blocks may be included within the home area blocks within the storage device that are reserved for the thread during an RMW operation. In another embodiment, the writes to the home area blocks may be performed in parallel with the writes to the log shadow blocks.

In one embodiment, a single write operation may be used to both write the copy of the data to the free shadow block location within the storage device and update the log block within the storage device to point to the free shadow block location to which the copy of the data is written. This may be enabled utilizing reordered shadow blocks, combined log and shadow blocks, etc. In this way, I/O overhead may be reduced from two I/O operations per device to one I/O operation per device when performing the RMW operation.

In this way, the RMW operation may be performed with transaction-level atomicity. For example, the RMW operation may be performed at the storage device in a single step, with no partial write state. This ensures that the data and the parity information (e.g., the copy of the data), or multiple copies of the data (in the case of replication) are written to the storage device in a single atomic transaction, which may avoid data corruption during RMW operations within the storage device.

Additionally, by keeping the home area blocks and the log shadow blocks within a single storage device, a complexity of the RMW operation may be reduced, and resource costs of the RMW operation may also be lowered. This may improve a performance of RMW operations using the storage device, which may in turn improve a performance and operation of a system running intermediary storage in communication with the storage device.

Figure 5:
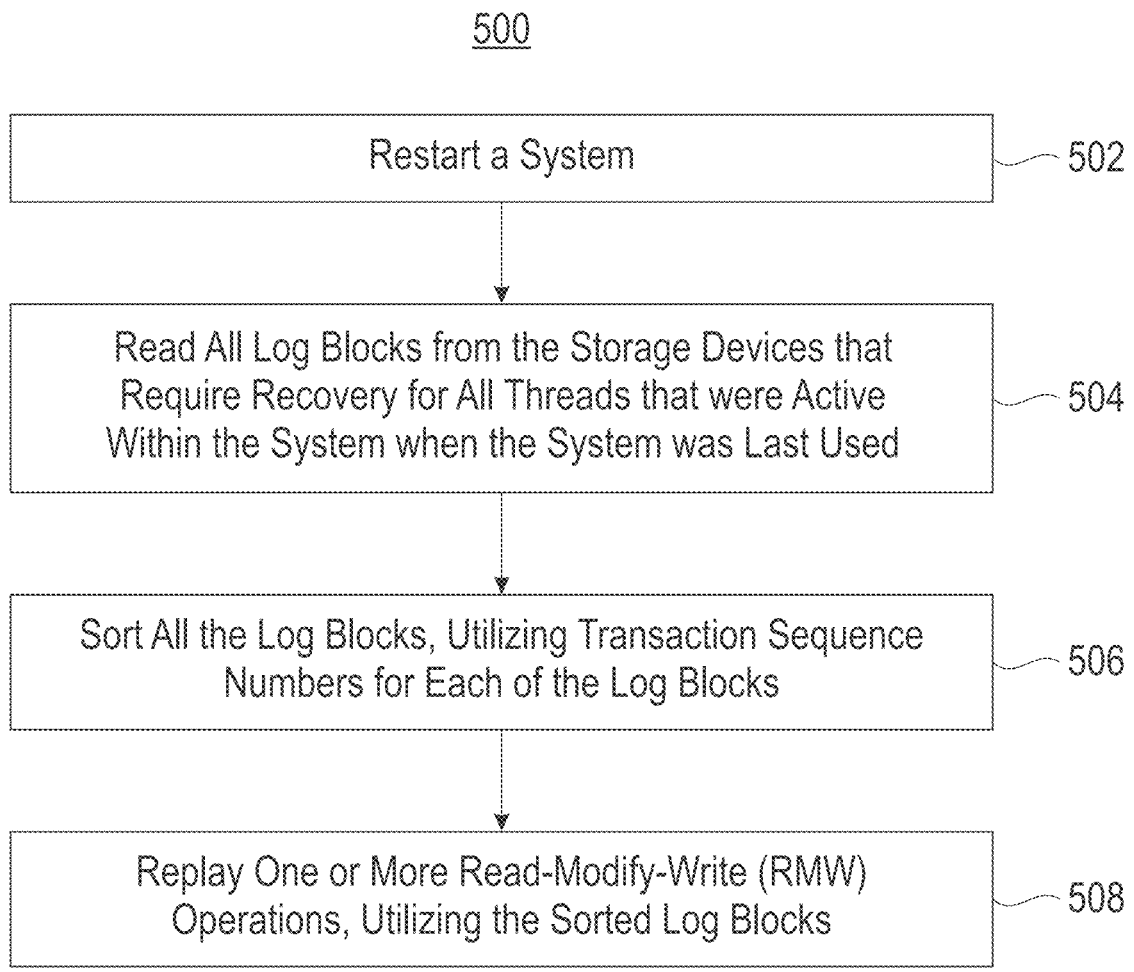
FIG. 5 illustrates a method for replaying read-modify-write (RMW) operations within a system, in accordance with one embodiment of the present invention.

Now referring to FIG. 5, a flowchart of a method 500 for replaying read-modify-write (RMW) operations within a system is shown according to one embodiment. The method 500 may be performed in accordance with the present invention in any of the environments depicted in FIGS. 1-3, and 6-8, among others, in various embodiments. Of course, greater or fewer operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a system is restarted. In one embodiment, the system may be restarted in response to a system crash, a system reboot, etc. In another embodiment, the system may include one or more storage devices. In yet another embodiment, the system may include intermediary storage in communication with the one or more storage devices.

Additionally, method 500 may proceed with operation 504, where all log blocks are read from the storage devices that require recovery for all threads that were active within the system when the system was last used. In one embodiment, the log blocks may be filtered so that only a predetermined number of pertinent log blocks are read (e.g., log blocks associated with predetermined threads, etc.). In another embodiment, each storage device within the system may include reserved blocks for each of a plurality of threads. In yet another embodiment, for each of the plurality of threads, a log block may be stored within the storage device within the reserved blocks for that thread.

Further, method 500 may proceed with operation 506, where all the log blocks are sorted, utilizing transaction sequence numbers for each of the log blocks. In one embodiment, each of the log blocks includes a pointer to an active shadow block location, as well as a monotonically-increasing transaction sequence number.

For example, transaction sequence numbers are assigned to threads with associated RMW operations. These transaction sequence numbers are increased monotonically as they are assigned. For instance, after a first sequence number is assigned to a first thread, a second sequence number is determined by monotonically increasing the first sequence number, and the second sequence number is assigned to a second thread that is instantiated after the first thread. As a result, a thread with a lower sequence number was instantiated before a thread with a greater sequence number.

Further still, in one embodiment, the log blocks may be sorted from lowest to highest sequence number.

Also, method 500 may proceed with operation 508, where one or more read-modify-write (RMW) operations are replayed, utilizing the sorted log blocks. In one embodiment, starting with the log block with the lowest sequence number, the updated active shadow block location pointed to by the log block may be determined. In another embodiment, the copy of the data stored within the updated active shadow block location may be retrieved and stored within one or more blocks of a home area of the storage device that is reserved for the same thread that stored the copy of the data within the updated active shadow block location.

In this way, data writes may be replayed within a system after a system crash or reboot.

Figure 6A:
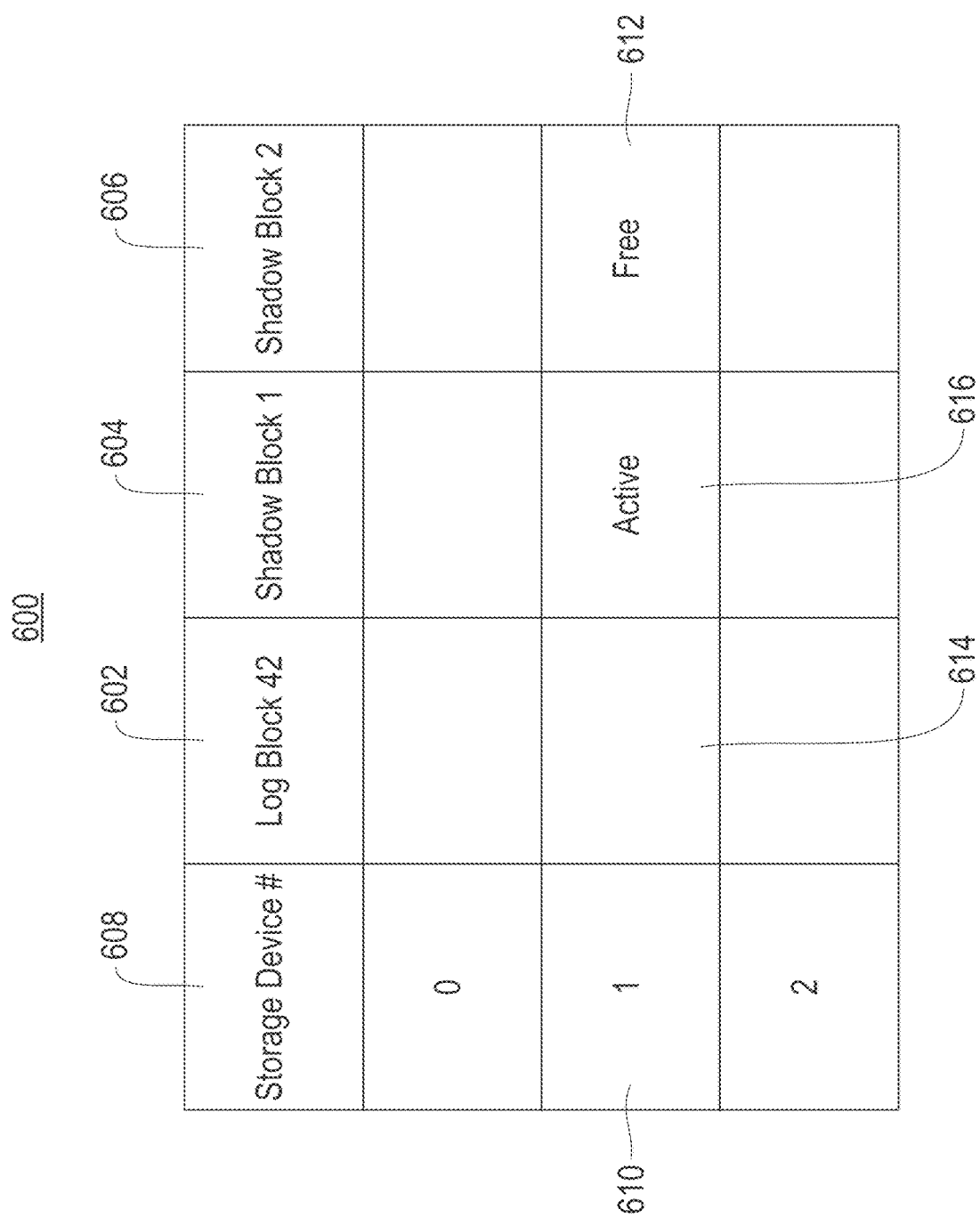
FIG. 6A illustrates an exemplary representation of contents of log blocks and shadow blocks within a plurality of storage devices prior to a read-modify-write (RMW) operation, in accordance with one embodiment of the present invention.

FIG. 6A illustrates an exemplary representation 600 of contents of log blocks and shadow blocks 602-606 within a plurality of storage devices 608 prior to a read-modify-write (RMW) operation, according to one exemplary embodiment. As shown, the log blocks and shadow blocks 602-606 include a log block 602 and shadow blocks 604-606 that are reserved for a predetermined thread (in this case, thread 42).

Additionally, in response to an initiation of the RMW operation and the assigning of the RMW operation to thread 42, the RMW operation is analyzed to determine which storage devices 608 are to be written to during the RMW operation. In this case, the RMW operation instructs the writing of data to storage device 1 610 within a distributed storage environment.

In one embodiment, the thread may include a process for performing a RMW operation (e.g., by attempting to write one or more data blocks atomically to the storage devices 608, etc.).

Further, in response to determining that storage device 1 610 is to be written to during the RMW operation, a second shadow block location 612 is determined to store a free shadow block within storage device 1 610. In one embodiment, the second shadow block location 612 may be determined to store the free shadow block by referencing the log block 614 for storage device 1 610, which points to the first shadow block 616 as the active shadow block. In another embodiment, a separate location cache may be referenced to identify the second shadow block location 612.

Figure 6B:
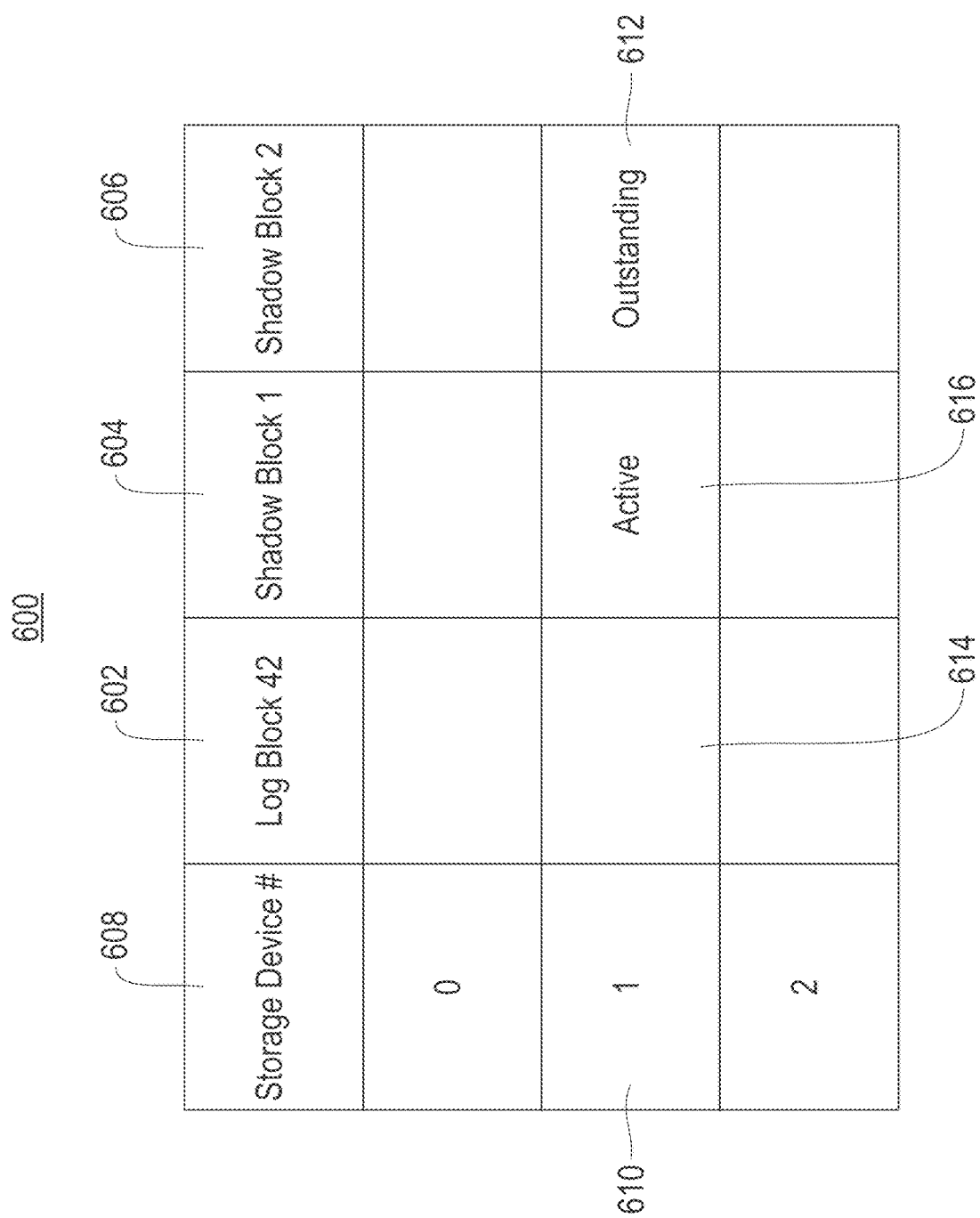
FIG. 6B illustrates an exemplary representation of contents of log blocks and shadow blocks within a plurality of storage devices during a read-modify-write (RMW) operation, in accordance with one embodiment of the present invention.

FIG. 6B illustrates an exemplary representation 600 of contents of log blocks and shadow blocks 602-606 within a plurality of storage devices 608 during a read-modify-write (RMW) operation, according to one exemplary embodiment. As shown, once the second shadow block location 612 is determined to store the free shadow block within storage device 1 610 in FIG. 6A, a copy is made of data to be written to the storage device during the RMW operation, and the copy of the data is written to the second shadow block location 612 within storage device 1 610.

At this point, the second shadow block location 612 now stores the updated active shadow block. The second shadow block location 612 is marked as "outstanding" since the log block 614 for storage device 1 610 is not yet updated to point to the second shadow block location 612 as the updated active shadow block.

Figure 6C:
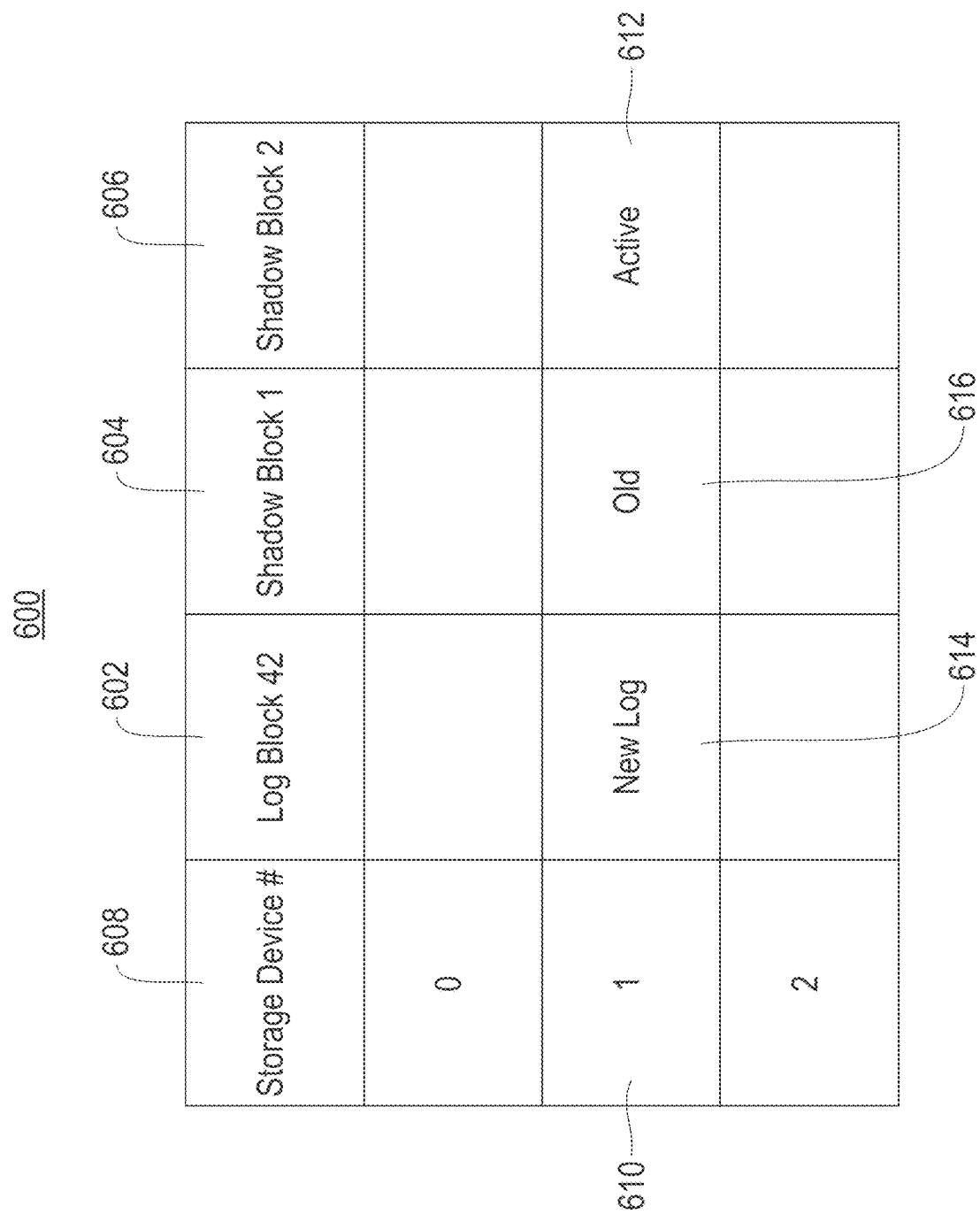
FIG. 6C illustrates an exemplary representation of contents of log blocks and shadow blocks within a plurality of storage devices after a completion of a read-modify-write (RMW) operation, in accordance with one embodiment of the present invention.

FIG. 6C illustrates an exemplary representation 600 of contents of log blocks and shadow blocks 602-606 within a plurality of storage devices 608 after a completion of a read-modify-write (RMW) operation, according to one exemplary embodiment. As shown, after a copy of data is written to the second shadow block location 612 within storage device 1 610 in FIG. 6B, the log block 614 for storage device 1 610 is updated to point to the second shadow block location 612 as the updated active shadow block.

The second shadow block location 612 is marked as "active" since the log block 614 for storage device 1 610 has been updated to point to the second shadow block location 612 as the updated active shadow block. The first shadow block location 616 is then marked as "Old" since it contains copy data older than the copy data stored in the second shadow block location 612, and is no longer pointed to by the log block 614.

In one embodiment, the log block 614 for storage device 1 610 is updated to point to the second shadow block location 612 at the same time the copy of the data is written to the second shadow block location 612 within storage device 1 610. This may enable a state transition from FIG. 6A directly to FIG. 6C, without the intermediary state shown in FIG. 6B.

In this way, an atomic RMW operation may be performed within the plurality of storage devices 608, utilizing the log blocks and shadow blocks 602-606 of the storage devices 608.

FIG. 7 illustrates an exemplary representation 700 of combined log and shadow blocks 702-704 within a plurality of storage devices 706, according to one exemplary embodiment. As shown, the combined log and shadow blocks 702-704 are reserved for a predetermined thread (in this case, thread N).

Additionally, in response to RMW operations and the assigning of the RMW operations to thread N, thread N ping-pongs between the combined log and shadow blocks 702-704 using a single I/O operation. During recovery, the system reads both of the combined log and shadow blocks 702-704 and uses the block with the higher number for recovery operations.

Figure 8:
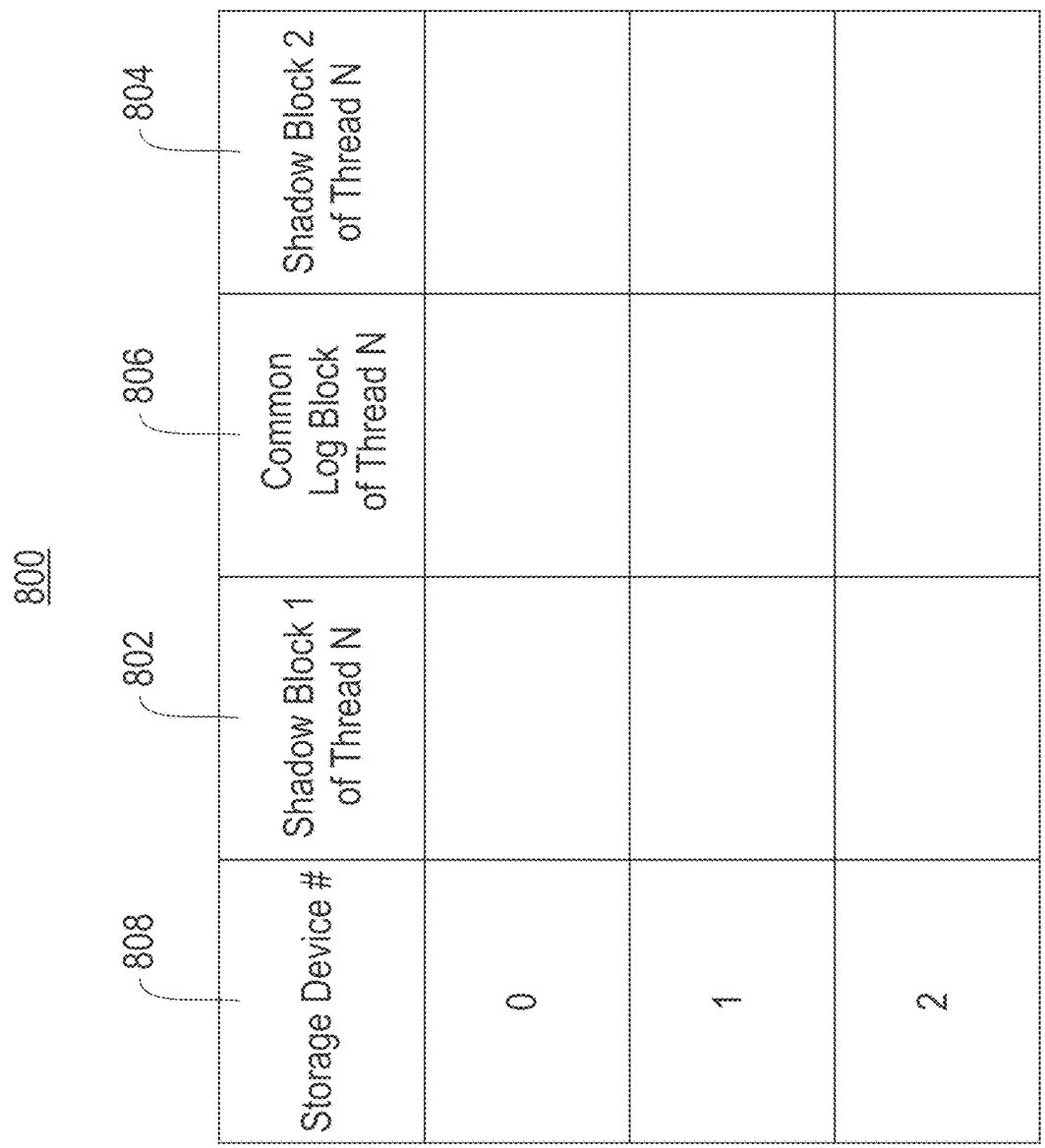
FIG. 8 illustrates an exemplary representation of reordered shadow blocks within a plurality of storage devices, in accordance with one embodiment of the present invention.

FIG. 8 illustrates an exemplary representation 800 of reordered shadow blocks 802-804 within a plurality of storage devices 808, according to one exemplary embodiment. As shown, the reordered shadow blocks 802-804 are reserved for a predetermined thread (in this case, thread N).

Additionally, a single common log block 806 is sandwiched between the reordered shadow blocks 802-804. In this way, a single write operation may be used to update one of the reordered shadow blocks 802-804 as well as the single common log block 806 together in a single I/O operation that writes to contiguous LBA regions on the storage device. During recovery, only the single common log block 806 is needed for recovery for thread N.

FIG. 9 illustrates an exemplary representation 900 of a single combined log and shadow block 902 within a plurality of storage devices 904, according to one exemplary embodiment. As shown, the single combined log and shadow block 702 is reserved for a predetermined thread (in this case, thread N).

The lack of ping-pong areas for thread N is possible because thread N will attempt to write to the single combined log and shadow block 902 only when the previous write it was handling has completed, thus no longer requiring a shadow block region. The single combined log and shadow block 902 is sized to match a block size of the storage device, which is guaranteed to provide atomic updates at the block level.

As a result, a crash when writing to the single combined log and shadow block 902 will result in either the old or the new copy on the disk being found during the next recovery. Additionally, thread N may write to M devices at a time (e.g., due to RAID operations) and the log block may be replicated on each of the M devices. Thus, if the single combined log and shadow block 902 is unreadable due to a media error (e.g., a hardware error), then recovery can still occur using a replica of the single combined log and shadow block 902 on other devices. When a single combined log and shadow block 902 of thread N is unreadable during recovery (or runs into a checksum error due to a torn write), then the system may mark the region on that device indicated in the single combined log and shadow block 902 as stale and may prevent future writes until the area is overwritten or asked to be ignored by an administrator.

Parallel Shadow Copy and Transaction Log Write for Atomic Write

To update erasure code protected storage devices, atomicity of write operation may be required to ensure code is always consistent. In a system where NV (Non-Volatile) memory is available, the write operation is buffered in NV memory, so power outages and software crashes may not interrupt the write operation. As a result, atomicity of writes is guaranteed. However, NV memory is expensive and complex to integrate with regular systems. Systems without NV memory rely on software technique to implement atomic write.

In general, such techniques involve two parts: one is to write the updated content to a temporary location, which is called a shadow copy location, before writing to its intended location (called a home location). The other is to keep track of the outstanding write operations in a log, which is called a transaction log. The transaction log stores the details of the outstanding writes such as the home location and the shadow copy location. In the event of a system crash or a power outage, the transaction log is scanned and then replayed idempotently (e.g., by updating a home location from a shadow copy) to ensure that all the outstanding writes are atomic.

However, transactional logs and shadow copies have a performance impact. It takes at least two extra writes for a single atomic write operation. These extra I/O operations makes a Read-Modify-Write operation slower. As a result, optimization may be performed by directing the log and shadow I/O operations to a separate device. However, by doing this, the cost of the system is increased, as fast and reliable NV storages are expensive. Additionally, the complexity of the system is increased by requiring extra devices. Further, the improvement in I/O operations may not scale with the main storage devices (e.g., in a large system, a dedicated central log device would eventually become a performance bottleneck).

In one solution, each block device in the storage array is partitioned into 3 parts: a metadata area, a log/shadow area, and a home area. The metadata area is for storing permanent or infrequently-updated information about the storage system. The log/shadow area is for storing temporary block updates and keeping track of outstanding I/O operations. The size of this area is proportional to the concurrency of the I/O workload.

The home area stores the final version of the contents of the blocks. This implementation introduces a method of localizing shadow block copies to the associated erasure code block, and replicating the log to a minimum set of blocks within the log/shadow area, thereby reducing the write amplification associated with read-modify-write operations of home area blocks. The implementation also integrates the log with the primary storage, so that an external log is not required, which simplifies the system design and eliminates a performance bottleneck.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   initiating a read-modify-write (RMW) operation;
   assigning the RMW operation to a thread;
   identifying a storage device associated with the RMW operation;
   assigning a log block within the storage device to the thread;
   determining a free shadow block location within the storage device;
   creating a copy of data to be written to the storage device during the RMW operation;
   writing the copy of the data to the free shadow block location within the storage device;
   updating the log block within the storage device to point to the free shadow block location to which the copy of the data is written; and
   writing the data to one or more blocks of a home area of the storage device.

2. The computer-implemented method of claim 1, wherein the RMW operation includes an operation that writes data to a plurality of storage devices included within a distributed storage environment.

3. The computer-implemented method of claim 1, wherein the thread is associated with predetermined blocks of the home area of each of a plurality of storage devices.

4. The computer-implemented method of claim 1, wherein the thread is associated with predetermined log shadow blocks of each of a plurality of storage devices.

5. The computer-implemented method of claim 1, wherein the RMW operation is assigned a monotonically-increasing transaction sequence number associated with the RMW operation.

6. The computer-implemented method of claim 1, wherein the storage device associated with the RMW operation is identified based on a specific erasure code utilized within a distributed storage environment.

7. The computer-implemented method of claim 1, wherein the storage device includes reserved log shadow blocks reserved for the thread to which the RMW operation is assigned, the reserved log shadow blocks including an active shadow block, a free shadow block, and a log block.

8. The computer-implemented method of claim 1, wherein the free shadow block location is determined utilizing a log block within the storage device.

9. The computer-implemented method of claim 1, wherein the free shadow block location is determined utilizing a location cache.

10. The computer-implemented method of claim 1, wherein a transaction sequence number associated with the RMW operation is also stored within the log block.

11. The computer-implemented method of claim 1, wherein the writing of the data to the one or more blocks of the home area is performed in parallel with the writing of the copy of the data to the free shadow block location.

12. The computer-implemented method of claim 1, further comprising:
   restarting a system;
   reading all log blocks for all threads within the system;
   sorting all the log blocks, utilizing transaction sequence numbers for each of the log blocks; and
   replaying one or more read-modify-write (RMW) operations, utilizing the sorted log blocks.

13. The computer-implemented method of claim 1, wherein a single write operation is used to both write the copy of the data to the free shadow block location within the storage device and update the log block within the storage device to point to the free shadow block location to which the copy of the data is written.

14. A computer program product for optimizing atomic writes to a storage device, the computer program product comprising a computer readable storage medium having program instructions embodied therewith, wherein the computer readable storage medium is not a transitory signal per se, the program instructions executable by a processor to cause the processor to perform a method comprising:
- initiating, by the processor, a read-modify-write (RMW) operation;
- assigning, by the processor, the RMW operation to a thread;
- identifying, by the processor, a storage device associated with the RMW operation;
- assigning, by the processor, a log block within the storage device to the thread;
- determining, by the processor, a free shadow block location within the storage device;
- creating, by the processor, a copy of data to be written to the storage device during the RMW operation;
- writing, by the processor, the copy of the data to the free shadow block location within the storage device;
- updating, by the processor, the log block within the storage device to point to the free shadow block location to which the copy of the data is written; and
- writing, by the processor, the data to one or more blocks of a home area of the storage device.

15. The computer program product of claim 14, wherein the RMW operation includes an operation that writes data to a plurality of storage devices included within a distributed storage environment.

16. The computer program product of claim 14, wherein the thread is associated with predetermined blocks of the home area of each of a plurality of storage devices.

17. The computer program product of claim 14, wherein the thread is associated with predetermined log shadow blocks of each of a plurality of storage devices.

18. The computer program product of claim 14, wherein the RMW operation is assigned a monotonically-increasing transaction sequence number associated with the RMW operation.

19. The computer program product of claim 14, wherein the storage device associated with the RMW operation is identified based on a specific erasure code utilized within a distributed storage environment.

20. A system, comprising:
- a processor; and
- logic integrated with the processor, executable by the processor, or integrated with and executable by the processor, the logic being configured to:
- initiate a read-modify-write (RMW) operation;
- assign the RMW operation to a thread;
- identify a storage device associated with the RMW operation;
- assign a log block within the storage device to the thread;
- determine a free shadow block location within the storage device;
- create a copy of data to be written to the storage device during the RMW operation;
- write the copy of the data to the free shadow block location within the storage device;
- update the log block within the storage device to point to the free shadow block location to which the copy of the data is written; and
- write the data to one or more blocks of a home area of the storage device.

* * * * *